United States Patent
Balasubramanian et al.

(10) Patent No.: US 7,555,298 B2
(45) Date of Patent: Jun. 30, 2009

(54) QUEUE PREDICTION TO REDUCE VIRTUAL HANDOFF LATENCY

(75) Inventors: Srinivasan Balasubramanian, San Diego, CA (US); Seema Madan, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 11/321,167

(22) Filed: Dec. 29, 2005

(65) Prior Publication Data

US 2007/0155385 A1 Jul. 5, 2007

(51) Int. Cl.
*H04Q 7/20* (2006.01)

(52) U.S. Cl. .................... 455/436; 455/435.1; 455/446; 455/450; 455/452.2; 455/437; 455/445; 455/447; 455/434

(58) Field of Classification Search ........................ None
See application file for complete search history.

(56) References Cited

U.S. PATENT DOCUMENTS

| | | | |
|---|---|---|---|
| 6,842,619 B2 * | 1/2005 | Lee et al. | 455/453 |
| 2005/0053034 A1 * | 3/2005 | Chiueh | 370/331 |
| 2005/0152308 A1 * | 7/2005 | Seol et al. | 370/328 |
| 2005/0181794 A1 * | 8/2005 | Rajkotia | 455/436 |
| 2007/0091801 A1 * | 4/2007 | Shahidi et al. | 370/230 |

* cited by examiner

*Primary Examiner*—Charles N Appiah
*Assistant Examiner*—Randy Peaches
(74) *Attorney, Agent, or Firm*—Coats & Bennett, P.L.L.C.

(57) ABSTRACT

In a high-rate packet data (HRPD) wireless communication network, an Access Terminal (AT) selects its serving cell, and additionally provides an advance indication of a pending cell selection. Upon receipt of the advance indication, the network directs data packets destined for the AT to the indicated target cell, which queues the data. The target cell obtains a prediction of an amount of data that the currently serving, or source, cell may transmit to the AT between the advance indication and the cell selection. Following the cell selection, the target cell transmits data packets to the AT beginning at an offset into the transmission queue that corresponds to the predicted data amount. When the target cell receives the actual transmitted data amount from the source cell, it may make adjustments in data packet transmission to the AT to ameliorate the effects of any miss-prediction.

26 Claims, 4 Drawing Sheets

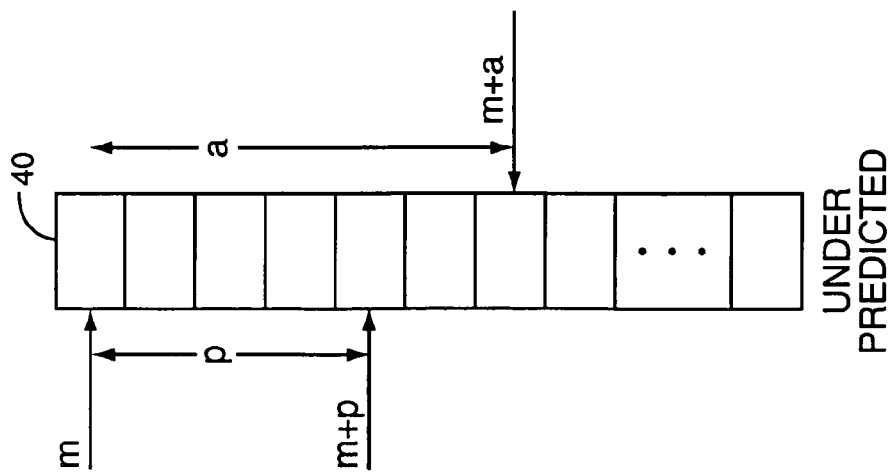
FIG. 3C  UNDER PREDICTED
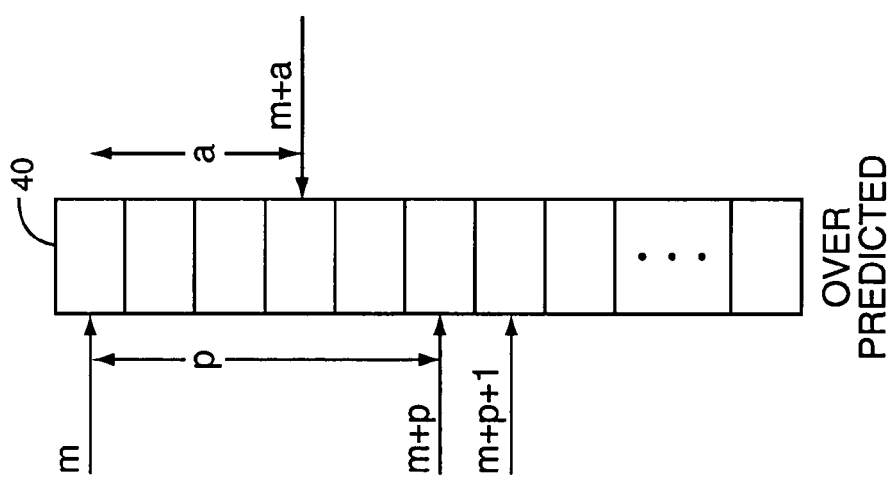
FIG. 3B  OVER PREDICTED
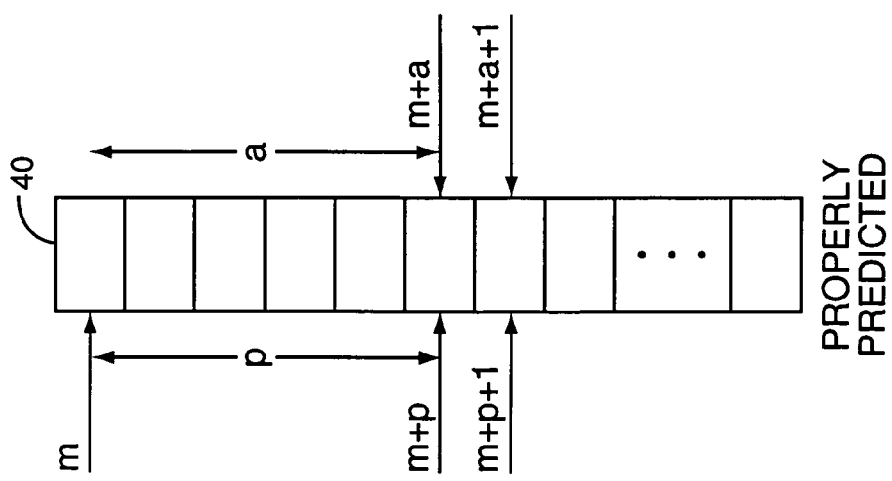
FIG. 3A  PROPERLY PREDICTED

QUEUE PREDICTION TO REDUCE VIRTUAL HANDOFF LATENCY

BACKGROUND OF THE INVENTION

The present invention relates generally to high speed packet data wireless communication systems, and in particular to reducing soft virtual handoff latency by transmitting data from a predicted queue offset at a target cell.

A recent development in wireless communication systems is the advent of high-rate packet data (HRPD) systems, in which packet data for multiple Access Terminals (AT) is broadcast by the Access Network (AN) on one or more shared, high-bandwidth, forward traffic channels. As with any wireless communication system, mobility management in HRPD systems requires the ability to transfer or "hand off" a mobile AT from a current, or source, serving sector to a new, or target, serving sector, as the AT moves further from the radio transceivers of the source sector. In the HRPD system the mobile is served by only one sector in the forward link at any one given point in time. The handoff may be between serving sectors of different cells, known as soft virtual handoff or cell selection, or it may be between serving sectors of the same cell, known as softer virtual handoff. The present invention is directed to soft virtual handoff; accordingly, reference is made herein to the source and target cells rather than sectors.

In HRPD systems, an AT selects a serving cell by covering its reverse link Data Rate Control (DRC) signals with the Walsh code of the target cell. In CDMA 1×EV-DO Revision A, the Data Source Control (DSC) reverse link channel was added to communicate an AT's intention to switch serving cells prior to actually doing so by changing its DRC cover. This provides the Access Network time to establish a network dialogue to the target cell, thus reducing delays in the handoff that cause noticeable service interruption to users for delay-sensitive services.

The DSC signal indicating a target cell allows the Access Network to establish a new network dialogue and begin transmitting data packets to the target cell, which queues the data prior to its selection by the AT's DRC cover. However, until the AT actually selects the target cell, data for the AT continues to be transmitted by the source cell. Thus, the target cell, when selected by the AT, will likely transmit some data packets that the AT has already received from the source cell, resulting in a waste of air interface resources and incurring a delay at the AT until the target cell advances to new packets (i.e., those not already transmitted by the source cell). Alternatively, following the soft virtual handoff, the source cell may send to the target cell, along a side haul connection, queue pointers identifying exactly which packets have been transmitted. In this case, the AT must wait until the target cell has received the queue pointers, before the target cell can begin transmitting data. In either case, the AT experiences a delay due to queue synchronization between the source and target cell. Queue synchronization is not an issue in the case of softer virtual handoff.

SUMMARY OF THE INVENTION

In a soft virtual handoff from a source to a target cell in a HRPD system, the target cell obtains a prediction of an amount of data that will be transmitted by the source cell prior to the AT selecting the target cell by a DRC cover. The target cell may obtain the prediction from the source cell, or may obtain parameters from the source cell by which to calculate the predicted amount. The target cell then begins transmitting data to the AT immediately upon receipt of the DRC cover pointing to the target cell, from an offset into its transmit buffer that corresponds to the predicted amount of data. When the target cell receives actual queue pointers from the source cell, it may make adjustments as necessary, such as immediately transmitting skipped data if it over-predicted, or skipping over data if it vastly under-predicted.

In one embodiment, the present invention relates to a method of serving an Access Terminal (AT) at a target cell when the AT is handed off from a source cell. Data to be transmitted to the AT is received and queued. A prediction of an amount of data the source cell may transmit to the AT is obtained. Data is transmitted to the AT beginning at an offset into the queue corresponding to the predicted amount In another embodiment, the present invention relates to a high-rate packet data wireless communication network. The network includes a core network and a plurality of Radio Base Stations (RBSs) in data communication with the core network, and operative to transmit data packets to one or more ATs over an air interface. The network also includes at least one AT receiving packet data from one RBS at a time, the AT operative to select the serving RBS and further operative to provide an advance indication of a pending change in serving RBS selection. Each RBS includes a controller operative to manage a transmit data queue by receiving data upon the RBS being indicated by an AT as pending selection as the AT's serving RBS; obtaining a prediction of an amount of data transmitted to the AT by the another, currently selected, serving RBS for the AT prior to the AT selecting the RBS; and following selection as serving RBS by the AT, transmitting data to the AT beginning at an offset into the queue corresponding to the predicted amount.

Of course, the present invention is not limited to the above features and advantages. Those skilled in the art will recognize additional features and advantages upon reading the following detailed description, and upon viewing the accompanying drawings.

BRIEF DESCRIPTION OF THE DRAWINGS

FIGS. 3A-3C are diagrams of a transmit queue, showing different relations between predicted and actual data transmission amounts.

DETAILED DESCRIPTION OF THE INVENTION

The present invention is described herein with reference to a high-rate packet data (HRPD) wireless communication system, such as 1×Ev-DO. However, the present invention is not limited to such a system, and may be advantageously applied to other types of wireless systems, such as 1×EV-DV and High-Speed Downlink Packet Access (HSDPA), as well as WiMax Fast Base Station Selection (FBSS) mode. In general, the inventive system and method are applicable to any soft virtual handoff wherein the mobile terminal selects the serving node of the network, and provides an advance indication of a change in that selection.

Figure 1:
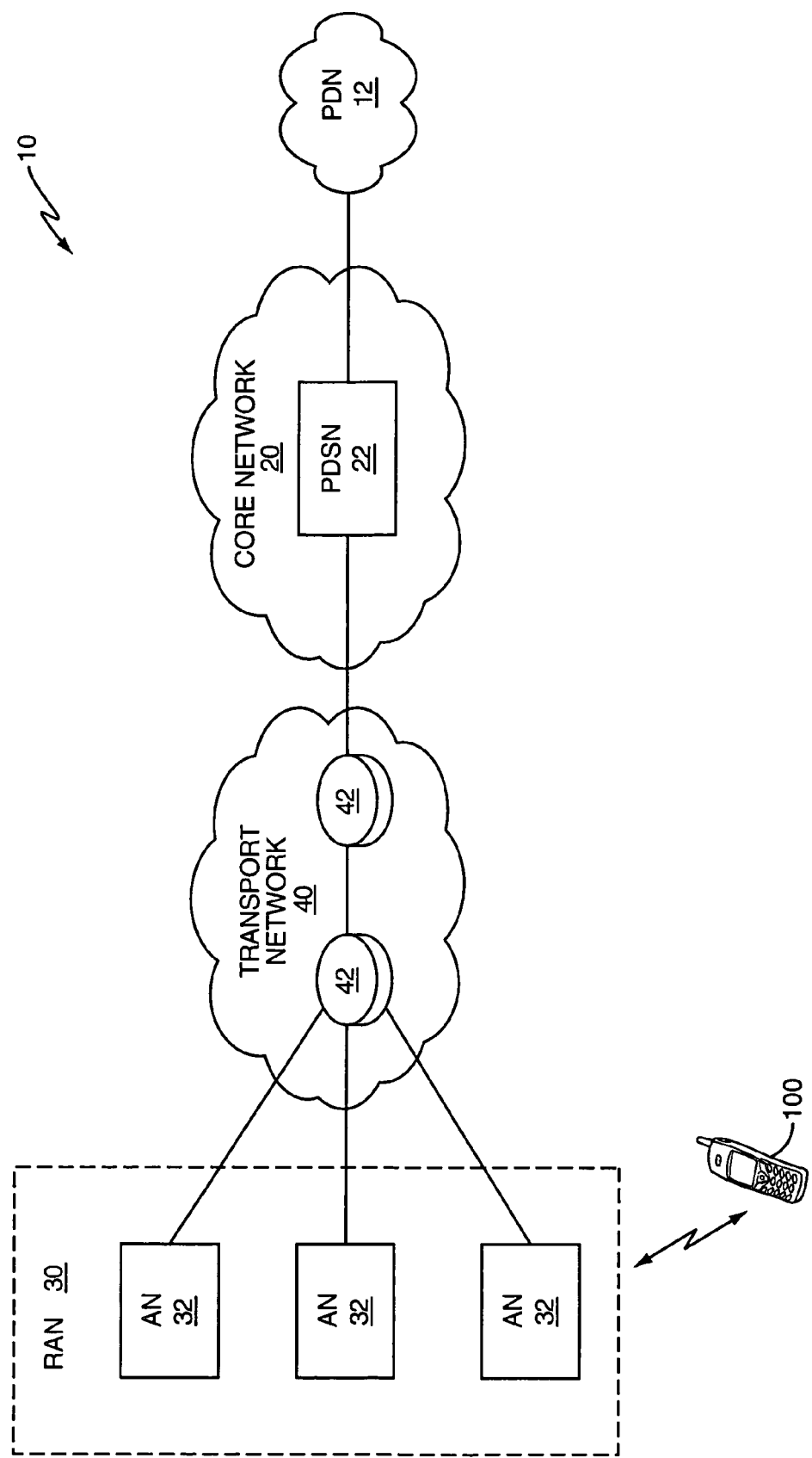
FIG. 1 is a block diagram of a wireless network.

FIG. 1 illustrates an exemplary high-rate packet data (HRPD) network 10 according to one embodiment of the invention providing wireless packet data services to a plurality of Access Terminals (ATs) 100. Communication network 10 has a distributed rather than centralized architecture.

Mobile communication network 10 comprises a packet-switched core network 20 including a Packet Data Serving Node (PDSN) 22, and a radio access network 30 comprising one or more Access Nodes (ANs) 32. An IP-based transport network 40 comprising one or more routers 42 connects the core network 20 with the RAN 30. The PDSN 22 connects to an external packet data network (PDN) 12, such as the Internet, and supports PPP connections to and from the ATs 100. The PDSN 22 adds and removes IP streams to and from the ANs 32 and routes packets between the external packet data network 12 and the ANs 32. The ANs 32 provide the connection between the ATs 100 and the core network 20. Each AN 32 provides coverage in a corresponding cell. In discussing the distributed architecture network 10 of FIG. 1, the terms AN and cell are used interchangeably.

Figure 2:
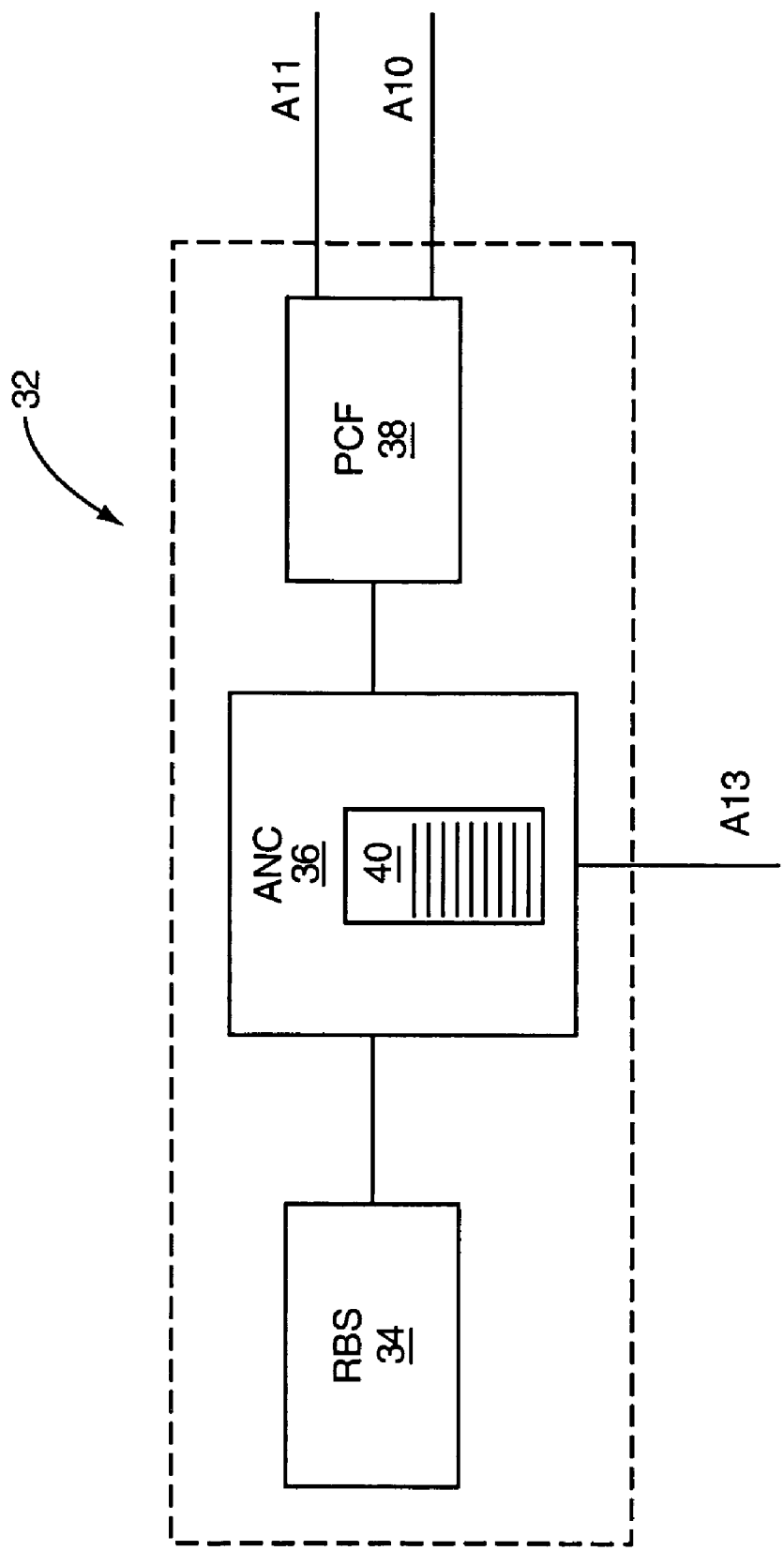
FIG. 2 is a functional block diagram of an Access Node of the network of FIG. 1.

FIG. 2 illustrates the logical elements of an exemplary AN 32. The AN 32 comprises a radio base station (RBS) 34, an access network controller (ANC) 36, and a Packet Control Function (PCF) 38. The RBS 34 (also known as a Base Transceiver Station or BTS) includes the radio equipment for communicating over the air interface with ATs 100. The ANC 36 controls the operation of the AN 32, manages radio resources allocated to the AN 32, and handles Layer 3 signaling. ANC 36 communicates over an A13 communication link with peer ANCs 36 in other ANs 32. The PCF 38 establishes, maintains, and terminates connections from the AN 32 to the PDSN 22.

Between the AN 32 and the PDSN 22, the packet data and signaling data travel over the A10 and A11 communication links respectively. Generic Routing Encapsulation (GRE) is used to transport data over the A10 communication link. GRE is a well-known protocol for encapsulation of an arbitrary network layer protocol over another arbitrary network layer protocol. The ANs 32 may operate, for example, according to the Telecommunications Industry Association (TIA) standard TIA-856-A, which defines an air interface between the AN 32 and ATs 100. Those skilled in the art will appreciate that the present invention may also use other air interface standards, such as TIA-2000 and the emerging Wideband CDMA standard.

During operation, the AT 100 establishes a point-to-point (PPP) session with the PDSN 22. During the session establishment, a radio-packet (R-P) connection is established between the PDSN 22 and the AN 32 to provide a transmission path for the user data and signaling between the PDSN 22 and the AN 32. The R-P connection includes the A10 connection for user data and the A11 connection for signaling data. In one exemplary embodiment, the PDSN 22 interfaces with the PCF 38 in the AN 32 by setting up a GRE tunnel. After establishing a PPP session, the mobile station 100 can transmit and receive packet data. The mobile stations 100 are typically assigned a Unicast Access Terminal Identifier (UATI) by one of the ANs 32 during session establishment. The UATI serves as a temporary identifier to identify the AT 100 during the session and is included in air interface messages.

To provide a continuous flow of data packets to the AT 100, the AN 36 maintains a queue, or buffer, 40 of transmit data packets. In general, the packets in the transmit queue 40 may conform to any protocol or level of encapsulation. For example, the packets may comprise Radio Link Protocol (RLP) data packets, Internet Protocol (IP) packets, GRE packets, or the like. The AN 36 may maintain additional buffers (not shown), such as a retransmit buffer, a received data buffer, or the like.

In a network 10 with a distributed architecture as shown in FIG. 1, an AT 100 will frequently move between ANs 32 during the course of a call. When the AT 100 signals an intention to hand off from a source AN 32 to a target AN 32 by the reverse link DSC channel, the network 10 establishes a dialogue and transmits data packets to the target AN 32 for transmission to the AT 100 following the virtual handoff. This may, for example, comprise establishing an A10 connection from the PDSN 22 to the target AN 32. In general, routing packets to the target AN 32 is a function of the network 10 and may be accomplished in numerous ways.

As depicted in FIGS. 3A-3C, the head of the transmit queue 40 at the target AN 32 is denoted as m. This is the first undelivered packet from the source AN 32 upon receipt of the DSC from the AT 100 indicating an intent to hand off to the target AN 32. The target AN 32 obtains a prediction of a number p of packets that the source AN 32 may transmit to the AT 100 after receiving the DSC and prior to the AT 100 selecting the target AN by changing the cover of its reverse link DRC channel. That is, the target AN 32 obtains a prediction that the source AN 32 will transmit to the AT 100 the data packets from queue positions m to m+p. This prediction may be obtained from the source AN 32 following the DSC indication that a sector selection is pending. Alternatively, the source AN 32 may transmit to the target AN 32 one or more parameters from which the target AN 32 may calculate the prediction. These parameters may, for example, include the average throughput for the AT 100 from the source AN 32, congestion levels in the source AN 32, the channel quality experienced by the AT 100 from the source AN 32, the traffic type, and the source AN 32 current buffer state (for example, packet delays or the jitter support needed for an application flow).

Regardless of how the prediction is obtained, when the target AN 32 detects that it has been selected as the serving sector by the cover of the DRC channel of the AT 100, the target AN 32 begins transmitting packets to the AT 100 beginning at the queue position m+p+1.

As depicted in FIG. 3A, if the prediction was correct, the amount a of data actually transmitted is equal to the number p of packets predicted. In such a case, the AT 100 immediately receives the next sequential data packet following the soft virtual handoff, and does not incur any delay in service due to queue synchronization between the source and target ANs 32. In some embodiments, backhaul optimization in the network 10 may be performed to transmit packets to the target AN 32 beginning at m+p+1, with packets from queue positions m to m+p being transmitted later. This may further optimize performance by allowing the target AN 32 to begin transmission of the correct data packet immediately upon the soft virtual handoff.

If a<p, as depicted in FIG. 3B, the amount of data that the source AN 32 would be able to transmit to the AT 100 prior to the soft virtual handoff was over-predicted. In this case, the data from queue positions m+a+1 to m+p were "skipped," and must be transmitted to the AT 100. When the source AN 32 transfers the pointer m+a+1 to the target AN 32 (or otherwise communicates the amount a of data actually transmitted), the target AN 32 may transmit the data from queue positions m+a+1 to m+p to the AT 100 at a higher priority. Note that in some cases, the "skipped" data packets will be recovered by the AT 100 according to the relevant transmission protocol. For example, if the transmit queue 40 is an RLP transmit queue, the peer RLP in the AT 100 will NAK the missing RLP packets, which the RLP controller in the target AN 32 will then retransmit.

If a>p, as depicted in FIG. 3C, the amount of data that the source AN 32 would be able to transmit to the AT 100 prior to the soft virtual handoff was under-predicted. In this case, the data packets transmitted by the target AN 32 from queue positions m+p+1 to m+a are duplicates, and under most protocols will be ignored by the AT 100. If the under-prediction was significant, and the target AN 32 is still transmitting duplicate packets when the source AN 32 provides the target AN 32 an indication of the actual number a of data packets transmitted, the target AN 32 may "jump" ahead and begin transmitting at queue position m+a+1.

The prediction is applied to every flow—both best-effort and flows with specific Quality of Service (QoS) requirements—that is active in the AT 100 at the time of the soft virtual handoff. The predicted amount p of data that may be transmitted to the AT 100 by the source AN 32 between the receipt of the DSC and the DRC cover depends on several factors, as discussed above. A primary factor is the rate at which the source AN 32 is serving data packets to the AT 100. This rate depends on the channel quality experienced by the AT 100, and the congestion caused by other users. The prediction p also depends on the QoS metrics required by the flow. Other factors may include the traffic type, and the buffer state at the source AN 32 (for example, packet delays or the jitter support needed for an application flow).

In one embodiment, the prediction algorithm may be optimized depending on the application type or QoS metric. For example, prediction accuracy increases for applications with constant rate flow such as Voice over IP (VoIP). Additionally, the impact due to prediction inaccuracy is lower for non-real-time applications, as compared to real-time applications.

Figure 4:
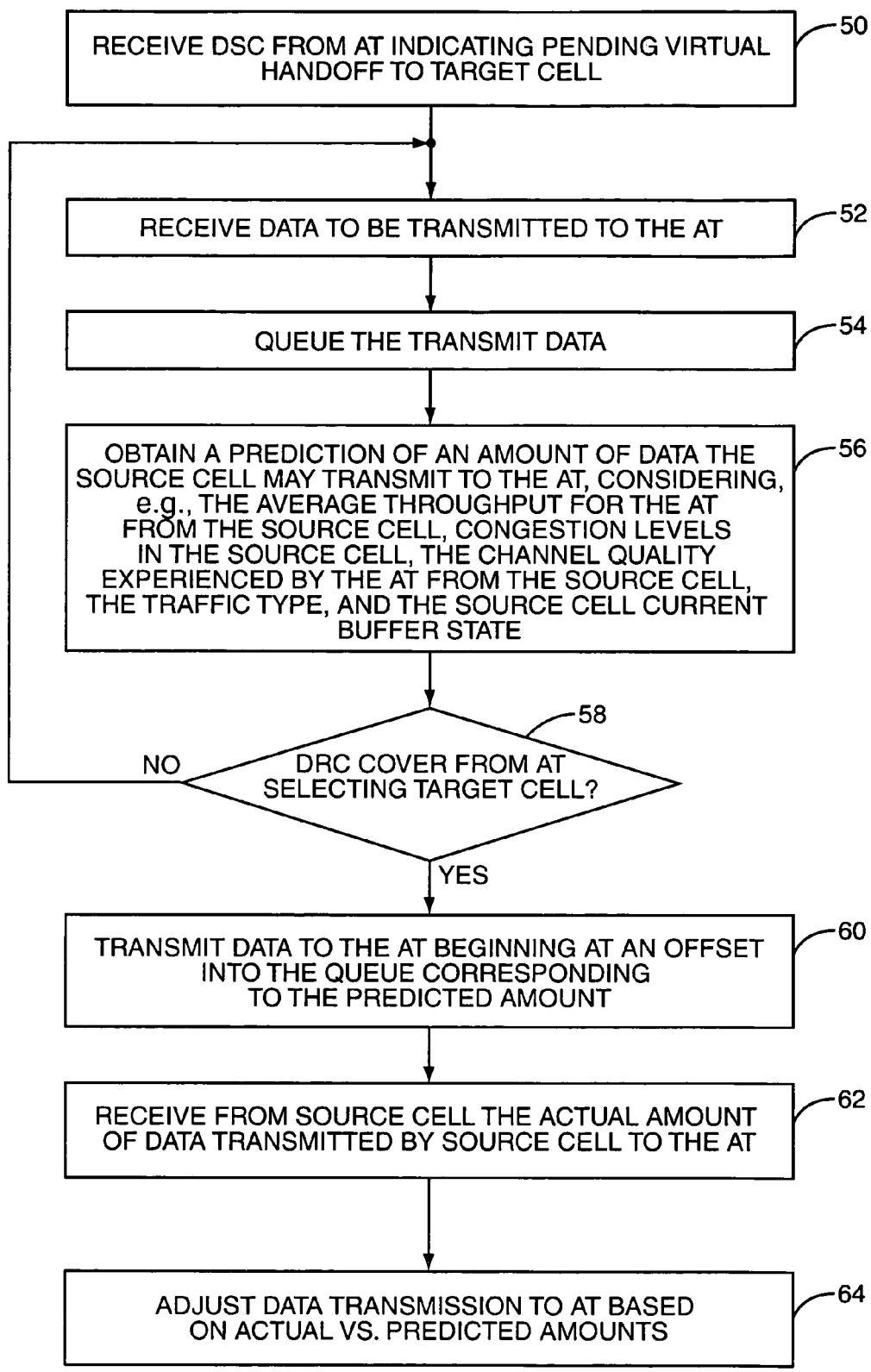
FIG. 4 is a flow diagram of a method of serving an Access Terminal following a virtual handoff.

FIG. 4 depicts a method of serving an AT 100 at a target cell following a soft virtual handoff from a source cell. The target cell receives a reverse link DSC signal from the AT 100, indicating a pending soft virtual handoff to the target cell (block 50). In response to the DSC signal, the target cell begins to receive data that is to be transmitted to the AT 100 (block 52). For example, in a centralized architecture, the target cell (RBS) may receive the data from a BSC or ANC; in a distributed architecture, the target cell (AN) may receive the data from the PDSN. In either case, the target cell queues the transmit data (block 54). The target cell obtains a prediction of an amount p of data that the source cell may transmit to the AT 100 prior to the AT 100 actually selecting the target cell and effecting the soft virtual handoff (block 56). The target cell may obtain the predicted amount from the source cell, or may calculate the predicted amount based on one or more metrics received from the source cell. These metrics may include the average throughput for the AT 100 from the source cell, congestion levels in the source cell, the channel quality experienced by the AT 100 from the source cell, the traffic type, and the source cell's current buffer state (for example, packet delays or the jitter support needed for an application flow). The target cell continues queuing incoming transmit data and obtaining revised predictions p until the DRC cover from the AT 100 selects the target cell as the serving AN 32 for the AT 100 (block 58).

When the AT 100 selects the target cell via its reverse link DRC cover (block 58), the target cell transmits data packets to the AT 100 beginning at an offset into the transmit queue corresponding to the predicted amount p (block 60). In particular, the target cell begins transmitting data packets at queue position m+p+1. The target cell then receives from the source cell the actual amount a of data transmitted by the source cell to the AT 100 between the DSC indication and the DRC cover cell selection (block 62). At this time, the target cell assesses the accuracy of its prediction p, and adjusts its transmission of data packets to the AT 100 accordingly (block 64). That is, if the amount p was over-predicted, the target cell may preemptively transmit data packets from the end of the source cell's actual transmission (m+a+1) to the end of the source cell's predicted transmission (m+p). On the other hand, if the amout p was under-predicted, and the target cell is still transmitting data packets already transmitted by the source cell, it may jump ahead and transmit data beginning at queue position m+a+1.

Another advent of CDMA 1×EV-DO Revision A is bi-casting, wherein transmit data for the AT 100 is simultaneously delivered to both the source and target cells following the DSC indication and prior to cell selection by the AT 100. In a distributed architecture such as that depicted in FIG. 1, this may comprise the PDSN 22 bi-casting to both the source and target ANs 32. In a centralized architecture, wherein a Base Station Controller (BSC) or centrial Access Network Controller (ANC) (not shown) controls a plurality of RBSs 34, the bi-casting may comprise the BSC/ANC simultaneously transmitting data to both the source and target RBS between the DSC indication and the cell selection via DRC cover. In either case, delay associated with queue synchronization between the source and target cells may be minimized or eliminated by using a source cell transmit prediction method according to one or more embodiments of the present invention.

By obtaining a prediction of the data a source cell may transmit to an AT 100 during a soft virtual handoff, and transmitting data to the AT 100 following the soft virtual handoff from an offset into a target cell transmit queue corresponding to the predicted amount of data, the packet delay performance for the AT 100 may be improved. Additionally, fewer interruptions may be experienced, with higher average per-user throughput. As the number of soft virtual handoffs increases, such as for a fast-moving AT 100, the gain achieved by the present invention increases. These gains may allow for more users to be scheduled during the virtual handoff intervals.

The prediction method of the present invention avoids the break in service that may otherwise be experienced as the target cell waits for queue pointers or other call context information from the source cell following a soft virtual handoff, prior to transmitting data to the AT 100 from the target cell. In other words, the present invention allows for the AT 100 to be served with data packets even as the queue synchronization between the source and target cells is still under progress.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of serving an Access Terminal (AT) at a target cell when the AT performs a virtual handoff off from a source cell, comprising:

receiving data to be transmitted to the AT;

queuing the transmit data;

obtaining a prediction of an amount of data the source cell may transmit to the AT; and transmitting data to the AT beginning at an offset into the queue corresponding to the predicted amount.

2. The method of claim 1 wherein obtaining a prediction of an amount of data the source cell may transmit to the AT comprises receiving the prediction from the source cell.

3. The method of claim 1 wherein obtaining a prediction of an amount of data the source cell may transmit to the AT comprises receiving one or more parameters from the source cell and calculating the prediction at the target cell.

4. The method of claim 3 wherein the parameters are selected from a list consisting of the average throughput to the AT, congestion levels in the source cell, the radio conditions the AT experiences from the source cell, the traffic type, and the buffer state in the source cell.

5. The method of claim 4 wherein the buffer state includes the packet delays experienced at the source cell and the jitter support needed at the source cell for an application flow.

6. The method of claim 1 wherein receiving data to be transmitted to the AT comprises receiving data beginning with the data packet following the last data packet transmitted to the AT by the source cell prior to receiving an indication from the AT to select the target cell.

7. The method of claim 6 wherein obtaining a prediction of an amount of data the source cell may transmit to the AT comprises obtaining a prediction of the amount of data the source cell may transmit following the indication to select the target cell and prior to the AT selecting the target cell.

8. The method of claim 1 wherein transmitting data to the AT comprises transmitting data to the AT after receiving a target cell selection from the AT.

9. The method of claim 1 wherein the amount of data that the source cell may transmit to the AT is predicted in response to the rate at which the AT is served by the source cell.

10. The method of claim 9 wherein the rate is determined in response to the channel quality the AT experiences from the source cell.

11. The method of claim 9 wherein the rate is determined in response to the congestion caused by other ATs served by the source cell.

12. The method of claim 1 wherein the amount of data that the source cell may transmit to the AT is predicted in response to the traffic type transmitted by the source cell.

13. The method of claim 1 wherein the amount of data that the source cell may transmit to the AT is predicted in response to the buffer state in the source cell.

14. The method of claim 13 wherein the buffer state includes the packet delays experienced at the source cell and the jitter support needed at the source cell for an application flow.

15. The method of claim 1 wherein predicting an amount of data the source cell may transmit to the AT comprises predicting an amount of data for each Quality of Service (QoS) flow maintained by the AT.

16. The method of claim 15 wherein the amount of data that the source cell may transmit to the AT for each QoS flow is predicted in response to the QoS metrics required by the flow.

17. The method of claim 1 wherein if the head of the transmit data queue at the target cell is m, and the predicted amount of data the source cell may transmit to the AT is p, the target cell begins transmitting data to the AT at queue position m+p+1.

18. The method of claim 17 further comprising receiving from the source cell an indication of the actual amount a of data transmitted by the source cell from queue position m.

19. The method of claim 18 further comprising, if a<p, transmitting data to the AT from queue positions m+a+1 to m+p.

20. The method of claim 19 wherein the data from queue positions m+a+1 to m+p has a higher priority at the target cell than other data in the queue.

21. The method of claim 18 further comprising, if a>p, skipping any data already transmitted by the source cell, and transmitting data at or ahead of queue position m+a+1.

22. A high-rate packet data wireless communication network, comprising:
a core network;
a plurality of Radio Base Stations (RBS) in data communication with the core network, and operative to transmit data packets to one or more Access Terminals (AT) over an air interface,
at least one AT receiving packet data from one RBS at a time, the AT operative to select the serving RBS and further operative to provide an advance indication of a pending change in serving RBS selection; and
a controller in each RBS operative to manage a transmit data queue by
receiving data for an AT upon the AT indicating the RBS is pending selection as the AT's serving RBS;
obtaining a prediction of an amount of data transmitted to the AT by another, currently selected, serving RBS prior to the AT selecting the RBS; and
following selection as serving RBS by the AT, transmitting data to the AT beginning at an offset into the queue corresponding to the predicted amount.

23. The network of claim 22 wherein a plurality of RBSs is controlled by an Access Network Controller (ANC), and wherein the ANC directs data packets for a particular AT to an RBS identified by the AT as pending selection as the AT's serving RBS.

24. The network of claim 23 wherein the ANC bi-casts data packets for the AT to both the current serving RBS and the RBS identified as pending selection between the AT's advance indication of a pending change in serving RBS selection and the AT's actual serving RBS selection.

25. The network of claim 22 wherein each RBS, together with an Access Network Controller (ANC) and Packet Control Function (PCF), comprises an Access Node (AN), and wherein a core network directs data packets for a particular AT to an AN identified by the AT as pending selection as the AT's serving AN.

26. The network of claim 25 wherein the core network bi-casts data packets for the AT to both the current serving AN and the AN identified as pending selection between the AT's advance indication of a pending change in serving AN selection and the AT's actual serving AN selection.

* * * * *

UNITED STATES PATENT AND TRADEMARK OFFICE
CERTIFICATE OF CORRECTION

| | |
|---|---|
| PATENT NO. | : 7,555,298 B2 |
| APPLICATION NO. | : 11/321167 |
| DATED | : June 30, 2009 |
| INVENTOR(S) | : Balasubramanian et al. |

It is certified that error appears in the above-identified patent and that said Letters Patent is hereby corrected as shown below:

In Column 2, Line 14, after "amount" insert -- . --.

In Column 5, Line 26, delete "(VoIP)." and insert -- (VoIP). --, therefor.

In Column 6, Line 3, delete "amout" and insert -- amount --, therefor.

In Column 6, Line 14, delete "centrial" and insert -- central --, therefor.

In Column 6, Line 57, in Claim 1, after "handoff" delete "off".

Signed and Sealed this

Twenty-fourth Day of November, 2009

David J. Kappos
*Director of the United States Patent and Trademark Office*